United States Patent [19]

Kurth et al.

[11] Patent Number: 4,612,530
[45] Date of Patent: Sep. 16, 1986

[54] MOTOR VEHICLE ALARM SYSTEM WITH ACOUSTIC SIGNAL EMISSION VIA AT LEAST ONE RADIO LOUDSPEAKER INSTALLED INTO THE MOTOR VEHICLE

[75] Inventors: Hermann Kurth; Peter Robitschko, both of Sindelfingen, Fed. Rep. of Germany

[73] Assignee: Daimler-Benz Aktiengesellschaft, Fed. Rep. of Germany

[21] Appl. No.: 722,509

[22] Filed: Apr. 12, 1985

[30] Foreign Application Priority Data

Apr. 12, 1984 [DE] Fed. Rep. of Germany ....... 3413769

[51] Int. Cl.$^4$ .......................... B60R 25/00; G10K 5/04
[52] U.S. Cl. .................................. 340/63; 340/384 R; 340/691; 381/86; 181/141; 307/10 AT
[58] Field of Search ................. 340/63, 540, 541, 691, 340/692, 384 R, 384 E, 404, 405, 328; 381/24, 59, 86, 90; 181/141; 367/197–199; 307/10 AT, 10 R; 180/287

[56] References Cited

U.S. PATENT DOCUMENTS 4,441,577  4/1984  Kurihara ............................ 181/141
4,553,630  11/1985  Ando ................................. 181/141

*Primary Examiner*—Donnie L. Crosland
*Attorney, Agent, or Firm*—Barnes & Thornburg

[57] ABSTRACT

An alarm system having improved acoustic signal transmitting capability is provided for motor vehicles. The radio speaker system of the vehicle is employed for both passenger listening and for warning signal transmission in the event of unauthorized intrusion or attempted theft. The speakers occupy their usual installation positions in a vehicle, such as horizontally mounted in the dashboard, when used for the purpose of listening to a radio or tape. When the vehicle is unoccupied, and theft or tampering are attempted, an alarm system is activated which causes a control element to swivel the speaker into a position parallel to an external surface of the vehicle. Due to this repositioning of the speaker, reflection of an alarm signal back into the interior of the vehicle is minimized, and transmission of the alarm signal to the outside of the vehicle is optimized.

13 Claims, 2 Drawing Figures

MOTOR VEHICLE ALARM SYSTEM WITH ACOUSTIC SIGNAL EMISSION VIA AT LEAST ONE RADIO LOUDSPEAKER INSTALLED INTO THE MOTOR VEHICLE

BACKGROUND AND SUMMARY OF THE INVENTION

This invention relates generally to alarm systems for motor vehicles and more specifically to alarm systems employing radio speakers for acoustical signal emission.

Alarm systems for motor vehicles employing radio speakers for sound emission are disclosed for example in German DE-OS No. 23 42 121. It is also generally known (for example, as disclosed in German DE-OS No. 32 35 071) to arrange the speaker systems used in automobiles on or under horizontal depositing surfaces in front of the rear window and/or in front dashboard panels behind the windshield. The axis of the speaker extends essentially vertically with respect to the horizontally arranged depositing surface or dashboard panel. This installation position has proven to be advantageous because the interior of the vehicle receives exposure to sound waves during operation of a radio or tape player which is enhanced by tne reflection of the sound waves at the front or rear window as well as at the ceiling of the vehicle. However, in order to meet individual demands, it has been proposed in German DE OS No. 20 53 038, DE-OS No. 31 11 078 and DE-Gbm No. 16 54 582 to rotatably and/or pivotably mount a speaker in a motor vehicle in such a way that the direction of the sound can be changed by manual adjustment.

When a speaker system is used for radio or tape player acoustic signal emission in connection with a motor vehicle alarm system, such as a warning system for unauthorized intrusion or theft, the arrangement of the speakers is primarily aimed at exposure of the vehicle interior to sound waves. Due to this arrangement, primarily designed for optimum sound emission in the vehicle interior, the level of alarm sound emission reaching the outside of the vehicle is not optimized.

Accordingly, it is an objective of the present invention to develop an alarm system of the above general type wherein the speaker additionally provides optimum sound emission when employed in a vehicle alarm system.

This and other objectives of the present invention are obtained by the provision of an alarm system for motor vehicles which employs at least one radio speaker installed in the vehicle for the purpose of generating an acoustic signal which is transmitted to the outside of the vehicle. The transmission of the acoustic alarm signal to the outside of the vehicle is improved in accordance with the present invention by providing a control element which swivels the speaker from its normal installed position into a position parallel with an external surface of the motor vehicle. In a preferred embodiment, the speaker is swivelled from a position parallel with a horizontal surface adjacent a vehicle window so that the surface of the speaker becomes parallel to the plane of the adjacent window. Alternatively, a speaker mounted in a vehicle door can be swivelled into a position parallel or nearly parallel witn respect to the outer surface of the vehicle door.

Other objects, advantages and novel features of the present invention will become apparent from the following detailed description of the invention when considered in conjunction with the accompanying drawings.

DETAILED DESCRIPTION OF THE DRAWINGS

Figure 1:
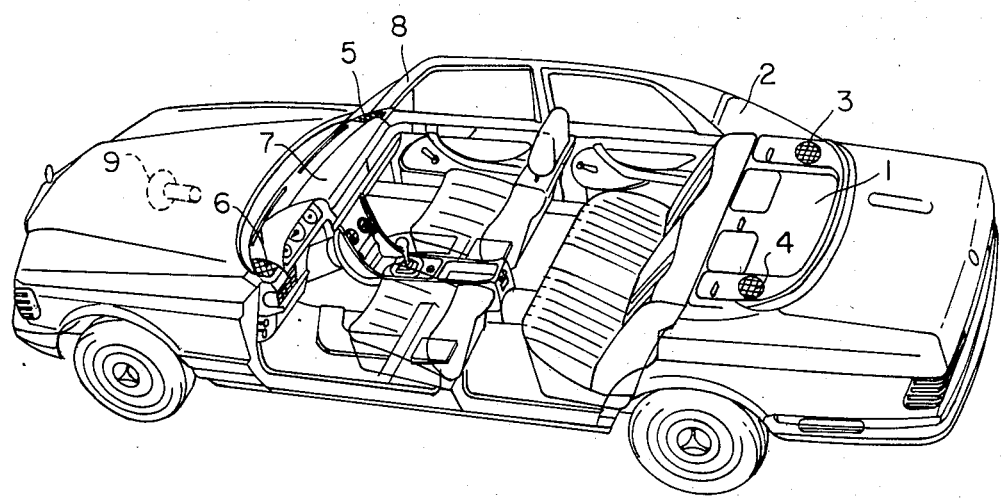
FIG. 1 shows the arrangement of speakers in a motor vehicle in the installed position.
Figure 2:
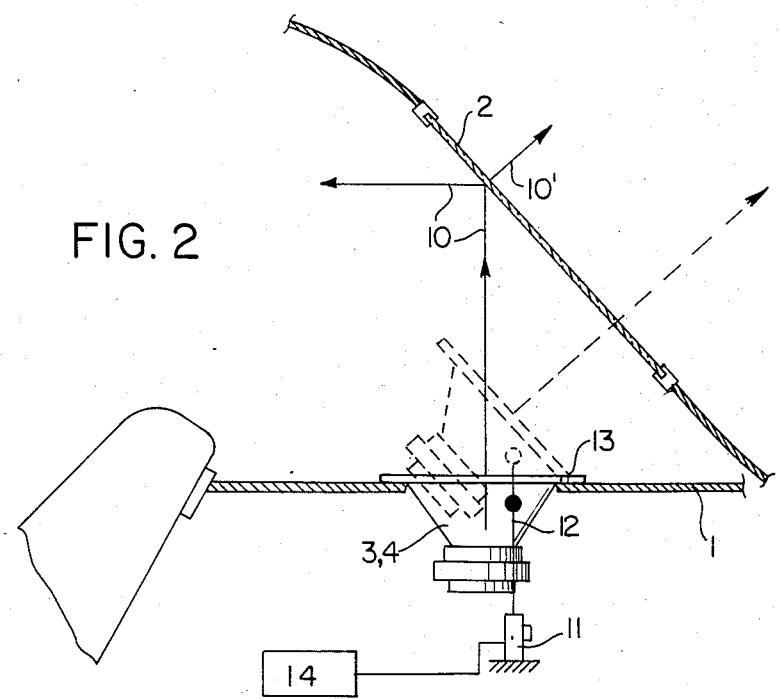
FIG. 2 is an enlarged partial sectional view of a speaker in both its normal installed position and in the swivelled-up position as activated by an intrusion/theft warning device.

As shown in FIG. 1, speakers 3 and 4 are installed in a motor vehicle in the rear horizontal surface 1 in front of the rear window 2 in such a way that the speaker axis extends vertically with respect to the surface 1, i.e., the speaker surface is parallel to the surface 1. In the same way, two additional speakers 5 and 6 are installed in a front horizontal dashboard panel 7 behind the windshield 8. The vehicle itself is equipped with an intrusion/theft warning device 14. When the intrusion/theft warning device is operational, unauthorized opening of a door, hood or trunk, an illegal or unauthorized activation or connection of the steering wheel lock (ignition), or actuation of the service brake will activate the intrusion/theft warning system. Upon activation, the alarm system causes speakers 3 to 6 and possibly another alarm generating means 9 to emit an acoustic signal for about 30 seconds, in intervals. As shown in FIG. 2, when the speakers are in the conventional installed position, the sonic waves 10 are reflected at the rear/front window so that only a small amount 10' of the acoustic capacity is transmitted to the outside for the purpose of notifying others concerning the intrusion/theft. In order to improve the acoustic transmission to the outside when an intrusion/theft occurs, control elements 11 in accordance with the present invention control the speakers and are connected with the speakers by means of control members 12. The speakers themselves are disposed so that they can be rotated on shafts 13 which are positioned adjacent to the front or rear window. When the vehicle is tampered with, the intrusion/theft warning system is activated via a signal. At the same time, this signal is also used for controlling the control elements 11 when elements 11 are activated, they displace the control members 12 and thus the speakers around their shafts into a parallel or nearly parallel position with respect to the window (shown in FIG. 2 by interrupted lines). The control elements which may, for example, operate pneumatically, hydraulically or mechanically via a motor operator, or electrically via a solenoid, are designed in such a way that the control member swivels the speaker into the desired position. It is contemplated that the control element can alternatively be connected to the speaker via an elastic control member. In this manner, when the control element is actuated, the stored spring energy of the control member is released via a spring-actuating connection. When the speakers swivel into a parallel position with respect to the window, strong sonic reflection is avoided, resonance space is considerably enlarged and the acoustic intensity of the warning signal emission to the outside of tne vehicle is considerably improved.

If the speakers are not installed in the front panel of tne dashboard but, for example, in the doors as door speakers, they are moved, via the control members, from their installed position into a parallel or almost parallel position with respect to the outer surface of the vehicle door.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

We claim:

1. An alarm system for a vehicle comprising:
   speaker means pivotably disposed inside said vehicle for emitting sound;
   alarm means for sensing physical contact with said vehicle, said alarm means transmitting signals upon sensing said contact; and
   control means for receiving said signals from said alarm means, said control means causing pivoting of said speaker means upon receipt of said signals and emitting of an alarm signal.

2. An alarm system according to claim 1, wherein said control means comprises control element means and control member means, said control element means capable of receiving said signals from said alarm means and transmitting secondary signals to said control member means upon receipt of said signals from said alarm means, said control member means capable of causing pivoting of said speaker means upon receipt of said secondary signals from said control element means.

3. An alarm system according to claim 2, wherein said control member comprises pneumatic pivoting means.

4. An alarm system according to claim 2, wherein said control member means comprises hydraulic pivoting means.

5. An alarm system according to claim 2, wherein said control member means comprises mechanical pivoting means.

6. An alarm system according to claim 2, wherein said control member means comprises electrical pivoting means.

7. An alarm system according to claim 2, wherein said control member means comprises elastic pivoting means.

8. An alarm system according to claim 7, wherein said control member means comprises spring-biased pivoting means.

9. An alarm system according to claim 1, wherein said speaker means are pivotably disposed about shaft means.

10. An alarm system according to claim 1, wherein said control means causes pivoting of said speaker means into a position substantially parallel to an external surface of said vehicle.

11. An alarm system according to claim 10, wherein said external surface comprises a windshield of said vehicle.

12. An alarm system according to claim 11, wherein said speaker means are pivotably disposed in a dashboard inside said vehicle.

13. A method for preventing theft of a motor vehicle comprising:
    pivotably disposing speaker means inside a vehicle providing said vehicle with alarm means for sensing physical contact with said vehicle and transmitting signals upon sensing said contact; and
    supplying said vehicle with control means for receiving said signals from said alarm means and causing pivoting of said speaker means upon receipt of said signals.

* * * * *